United States Patent
Yoshikawa et al.

(10) Patent No.: US 11,950,030 B2
(45) Date of Patent: Apr. 2, 2024

(54) ELECTRONIC APPARATUS AND METHOD OF CONTROLLING THE SAME, AND RECORDING MEDIUM

(71) Applicant: CANON KABUSHIKI KAISHA, Tokyo (JP)

(72) Inventors: Akio Yoshikawa, Kanagawa (JP); Takashi Seki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 17/701,073

(22) Filed: Mar. 22, 2022

(65) Prior Publication Data

US 2022/0321853 A1    Oct. 6, 2022

(30) Foreign Application Priority Data

Mar. 30, 2021  (JP) ................. 2021-058482

(51) Int. Cl.
*H04N 9/802* (2006.01)
*H04R 1/02* (2006.01)
*H04R 1/08* (2006.01)
*H04R 1/32* (2006.01)

(52) U.S. Cl.
CPC ............ *H04N 9/802* (2013.01); *H04R 1/028* (2013.01); *H04R 2499/11* (2013.01)

(58) Field of Classification Search
CPC .... H04N 9/802; H04R 1/028; H04R 2499/11; H04R 1/08; H04R 1/326
See application file for complete search history.

(56) References Cited

U.S. PATENT DOCUMENTS

| | | | | |
|---|---|---|---|---|
| 2021/0176589 A1* | 6/2021 | Ueno | .................. | G10H 1/0083 |
| 2022/0095035 A1* | 3/2022 | Igarashi | .............. | G09B 21/006 |
| 2022/0284915 A1* | 9/2022 | Rosenwein | ......... | G10L 21/0216 |
| 2023/0328429 A1* | 10/2023 | Bian | ................... | H04N 23/611 |
| 2023/0336694 A1* | 10/2023 | Wexler | .................. | G06V 20/52 |

FOREIGN PATENT DOCUMENTS

JP        2020107971 A    7/2020

* cited by examiner

*Primary Examiner* — Marly S Camargo
(74) *Attorney, Agent, or Firm* — Canon U.S.A., Inc. IP Division

(57) ABSTRACT

An electronic apparatus enables a user to suitably select sound to be collected in connection with moving image capturing. The electronic apparatus is communicable with a plurality of sound collection devices, and includes a display control unit that displays, for each of the plurality of sound collection devices, a display item corresponding to the each sound collection device, based on positional information for the respective each sound collection device, acquired by a position acquisition unit, and displays, with the plurality of displayed display items, an image acquired by an image acquisition unit, wherein the display control unit displays, for the each sound collection device, the corresponding display item, even if the display item corresponds to a sound collection device not located within a range of image capturing of the acquired image, and a control unit associates and records the acquired image and sound information in a recording device.

14 Claims, 8 Drawing Sheets

FIG.5
| CURRENTLY SELECTED MICROPHONE | SELECTABLE MICROPHONE | SELECTABLE MICROPHONE OUT OF SCREEN AREA | ERROR MICROPHONE |
|---|---|---|---|
|  | 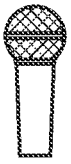 | 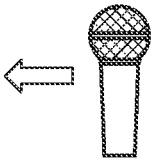 |  |

ELECTRONIC APPARATUS AND METHOD OF CONTROLLING THE SAME, AND RECORDING MEDIUM

BACKGROUND

Field

The present disclosure relates to a method of acquiring sound data in connection with image capturing.

Description of the Related Art

In moving image capturing, there can be a need to collect and record sound near an object (object to be captured) located in a direction in which a camera is directed, in addition to collection of sound near an electronic apparatus including an image capturing function, by a microphone incorporated in the electronic apparatus. Japanese Patent Application Laid-Open No. 2020-107971 discusses a technique to automatically select a microphone near an object located in a direction of a moving image captured by the user, to acquire sound collection information on the microphone, and to record the sound collection information in association with video data.

In the technique discussed in Japanese Patent Application Laid-Open NO. 2020-107971, an image capturing apparatus automatically selects a microphone to collect sound. Therefore, it is not possible to provide a user with the choice of using, depending on the situation, a microphone incorporated in the image capturing apparatus or a microphone located at a position different from a position near a main object being imaged by the user, for sound collection.

Accordingly, there can be circumstances where a microphone not desired by the user is automatically selected for sound collection, and the sound desired by the user is thus not recorded in some cases.

SUMMARY

The present disclosure provides improved techniques and mechanisms for enabling a user to suitably select sound to be collected in connection with moving image capturing.

According to various embodiments of the present disclosure, an electronic apparatus communicable with a plurality of sound collection devices is provided. The electronic apparatus includes a display unit, an image acquisition unit configured to acquire an image captured by an image capturing apparatus, from the image capturing apparatus, a position acquisition unit configured to acquire, for each of the plurality of sound collection devices, positional information relative to the image captured by the image capturing apparatus, a display control unit configured to control the display unit to display, for each of the plurality of sound collection devices, a display item corresponding to the each sound collection device, based on the positional information for the respective each sound collection device, acquired by the position acquisition unit, and to display, with the plurality of displayed display items, the image acquired by the image acquisition unit, wherein the display control unit is configured to perform control to display, for the each sound collection device, the corresponding display item, even if the display item corresponds to a sound collection device not located within a range of image capturing of the acquired image, and a control unit configured to perform control to acquire sound information from a sound collection device, selected by a user, from the plurality of sound collection devices, and to associate and record the acquired image and the acquired sound information in a recording device.

Further features of the present disclosure will become apparent from the following description of example embodiments with reference to the attached drawings.

BRIEF DESCRIPTION OF THE DRAWINGS

FIG. 5 illustrates display examples of states of the sound collection device (microphone) according to one embodiment of the present disclosure.

DESCRIPTION OF THE EMBODIMENTS

An example embodiment of the present disclosure is described below with reference to drawings.

Figure 1A:
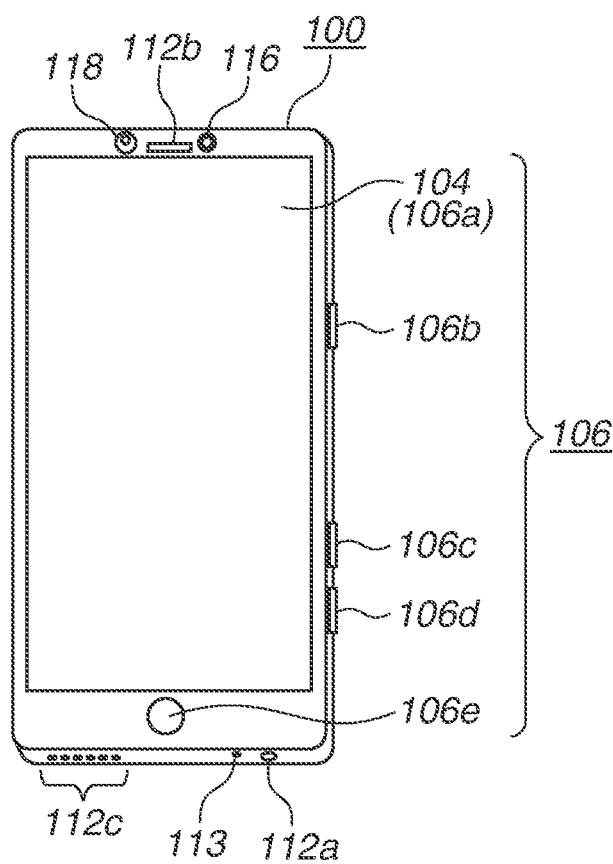
FIGS. 1A and 1B are appearance diagrams each illustrating a smartphone according to an example embodiment of the present disclosure.
Figure 1B:
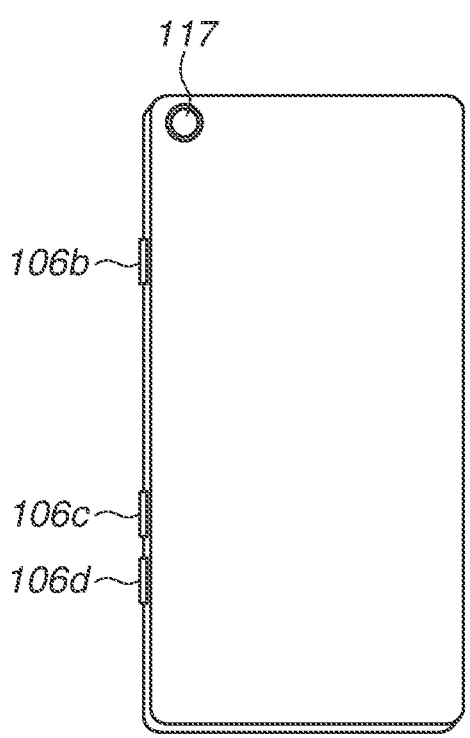

FIGS. 1A and 1B are appearance diagrams of a smartphone 100 as an example of an apparatus (electronic apparatus) to which various embodiments of the present disclosure are applicable. FIG. 1A is a front view of the smartphone 100, and FIG. 1B is a back view of the smartphone 100. In FIGS. 1A and 1B, a display 104 is a display unit provided on a front surface of the smartphone 100, to display an image and various kinds of information. A touch panel 106a is a touch operation member, and can detect touch operation (can perform touch detection) to a display surface (operation surface) of the display 104. The smartphone 100 can display a live-view image (LV image) captured by an in-camera 116 or an out-camera 117 or both, on the display 104.

A power supply button 106b is an operation member included in an operation unit 106, and can switch turning on/off of the display 104. Continuous depression (long depression) of the power supply button 106b for a certain time, for example, for three seconds makes it possible to switch turning on/off of the smartphone 100.

A volume plus button 106c and a volume minus button 106d are volume buttons to control volume of sound output from a sound output unit 112. When the volume plus button 106c is depressed, the volume is increased, whereas when the volume minus button 106d is depressed, the volume is reduced. Further, in a recording standby state during use of any of the cameras, the volume plus button 106c and the volume minus button 106d function as a shutter button to instruct still image capturing and a recording (REC) button to instruct recording start/stop of a moving image. A user may optionally set a specific function executed when the power supply button 106b and the volume minus button 106d are depressed at a time or when the volume minus button 106d is rapidly depressed a plurality of times.

A home button 106e is an operation button to display a home screen that is a startup screen of the smartphone 100, on the display 104. When the home button 106e is depressed while various applications are started up and used in the smartphone 100, the used various applications can be temporarily closed to display the home screen. It is assumed that the home button 106e is a physically depressible button; however, the home button 106e may be not the physical button but a touchable button having a similar function, displayed on the display 104. Alternatively, a function similar to the function of the home button 106e may be performed in response to a specific gesture performed on the touch panel 106a.

A sound output terminal 112a is an earphone jack, and is a terminal to output sound to an earphone, an external speaker, or the like. A sub-speaker 112b and a main speaker 112c are built-in speakers each outputting sound. In a case where a terminal to output sound, for example, an earphone cord is not attached to the sound output terminal 112a and under a situation where it is supposed that the user puts the smartphone 100 to an ear of the user in order to make a phone call, sound is output from the sub-speaker 112b. In other situation, for example, in a case where the user starts playback of a moving image without wearing an earphone, sound is output from the main speaker 112c.

A sound collection unit 113 is a microphone incorporated in the smartphone 100, and collects sound around the smartphone 100. For example, the sound collection unit 113 can collect voice of the user when the user makes a phone call by using the smartphone 100, or sound collected by the sound collection unit 113 can be associated with a moving image recorded by using the in-camera 116 or the out-camera 117. In FIG. 1A according to the present example embodiment, one sound collection unit 113 is incorporated in the smartphone 100; however, a plurality of sound collection units 113 may be incorporated in the smartphone 100.

Figure 2:
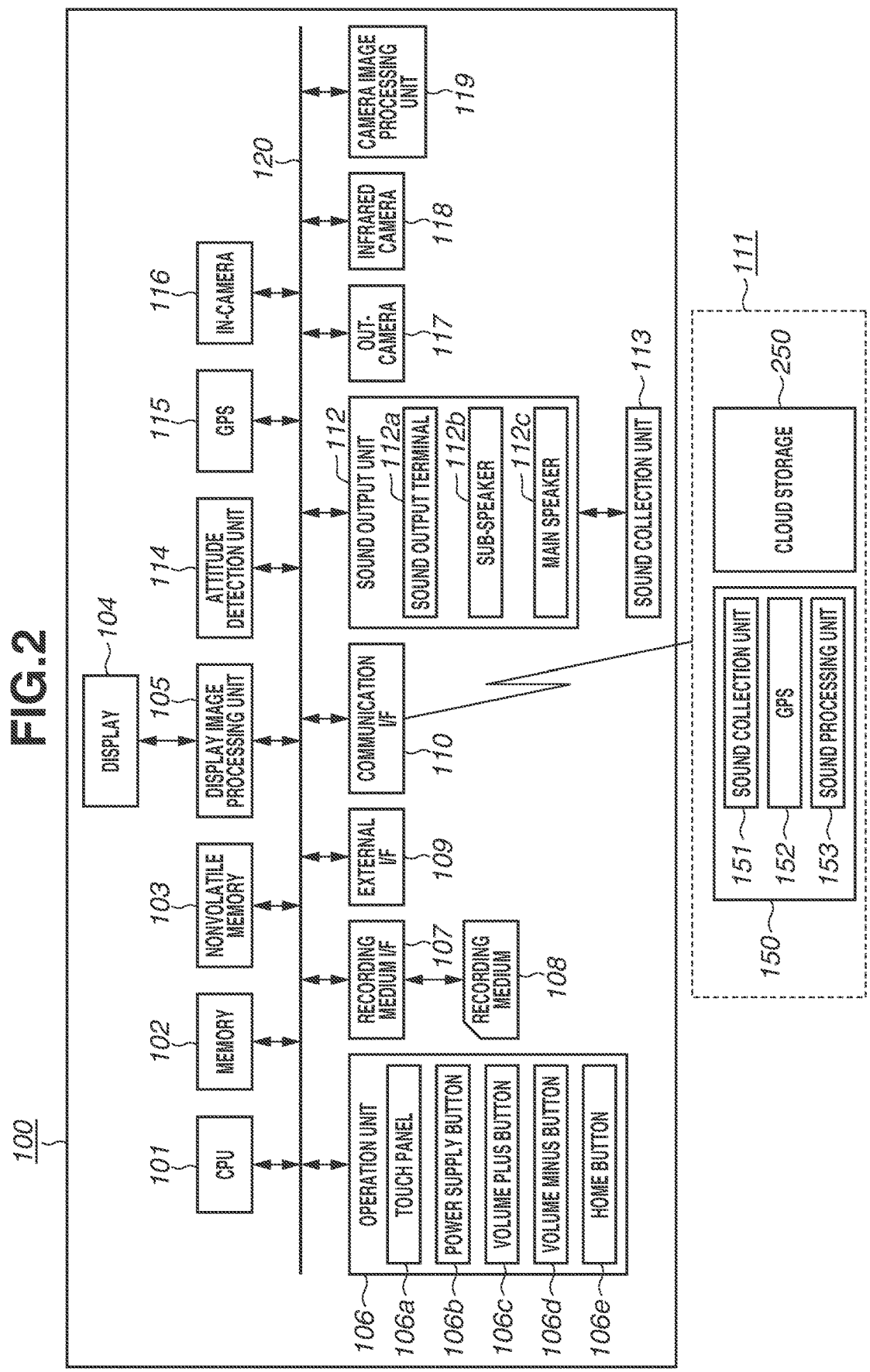
FIG. 2 is a block diagram illustrating a configuration of the smartphone according to the example embodiment of the present disclosure.

FIG. 2 is a block diagram illustrating a configuration example of the smartphone 100 according to the present example embodiment. A central processing unit (CPU) 101, a memory 102, a nonvolatile memory 103, a display image processing unit 105, the display 104, the operation unit 106, a recording medium interface (I/F) 107, an external I/F 109, and a communication I/F 110 are connected to an internal bus 120. Further, the sound output unit 112, the sound collection unit 113, an attitude detection unit 114, a global positioning system (GPS) 115, the in-camera 116, the out-camera 117, an infrared camera 118, and a camera image processing unit 119 are connected to the internal bus 120. The units connected to the internal bus 120 can mutually exchange data through the internal bus 120.

The CPU 101 is a control unit controlling the whole of the smartphone 100, and includes at least one processor or circuit. The memory 102 includes a random access memory (RAM) (such as a volatile memory using a semiconductor device). For example, the CPU 101 controls each of the units of the smartphone 100 by using the memory 102 as a work memory based on programs stored in the nonvolatile memory 103. The nonvolatile memory 103 stores image data, sound data, other data, various kinds of programs for operation of the CPU 101, and the like. The nonvolatile memory 103 includes a flash memory or a read only memory (ROM).

The display 104 displays an image and a graphical user interface (GUI) screen configuring a GUI under the control of the CPU 101. The CPU 101 controls the units of the smartphone 100 so as to generate a display control signal based on the programs and to generate and output a video signal to be displayed on the display 104. The display 104 displays a video based on the output video signal. Note that the smartphone 100 itself may include an interface to output the video signal to be displayed on the display 104, and the display 104 may be configured by an external monitor (such as a television).

The display image processing unit 105 analyzes the image and the GUI displayed on the display 104. The display image processing unit 105 also can detect a banner displayed on the display 104. As with the display 104, the display image processing unit 105 may be incorporated in the external monitor (such as a television).

The operation unit 106 is an input device receiving user operation, and includes a character information input device such as a keyboard, pointing devices such as a mouse and a touch panel, a button, a dial, a joystick, a touch sensor, and a touch pad. The touch panel is an input device that is planarly configured to be superimposed on the display 104 and outputs coordinate information corresponding to a touched position. The operation unit 106 includes the touch panel 106a, the power supply button 106b, the volume plus button 106c, the volume minus button 106d, and the home button 106e described above.

A recording medium 108 such as a memory card, a compact disc (CD), or a digital versatile disc (DVD) is attachable to the recording medium I/F 107. The recording medium I/F 107 reads out data from the attached recording medium 108 and writes data to the recording medium 108, under the control of the CPU 101. The recording medium 108 may be a built-in storage incorporated in the smartphone 100.

The external I/F 109 is an interface that is connected to an external apparatus through a wire cable or radio, and performs input/output of a video signal and a sound signal.

The communication I/F 110 establishes connection through radio or a wire cable, and transmits and receives a video signal and a sound signal to/from a sound collection device 150. The communication I/F 110 can establish connection with a wireless local area network (LAN) and the Internet 111. Further, the communication I/F 110 can communicate with an external apparatus through Bluetooth® or Bluetooth® Low Energy. The communication I/F 110 can transmit a moving image (including a live image) captured by the in-camera 116 or the out-camera 117 or both, and an image recorded in the recording medium 108, to a cloud storage 250, etc. Further, the communication I/F 110 can receive image data and other various kinds of information from the external apparatus.

The Internet 111 indicates a wireless LAN communication of Wi-Fi or the like, and a public wireless communication such as fourth generation (4G) communication and fifth generation (5G) communication.

The sound output unit 112 performs noise reduction processing and amplification processing on sound data input from the sound collection unit 113. Further, the sound output unit 112 outputs sound of a moving image and music data, operation sound, ring alert, various kinds of notification sound, and the like from the sound output terminal 112a to which an earphone or the like is connected, and from the speakers 112b and 112c, through wireless communication, etc.

The attitude detection unit 114 detects an attitude of the smartphone 100 to a gravity direction, and inclination of the attitude to axes of yaw, roll, and pitch. It is possible to determine whether the smartphone 100 is held horizontally, is held vertically, is directed upward, is directed downward, or takes an inclined attitude, based on the attitude detected by the attitude detection unit 114. This also makes it possible to detect a direction of the in-camera 116 or the out-camera 117. As the attitude detection unit 114, at least one of an acceleration sensor, a gyro sensor, a geomagnetic sensor, an azimuth sensor, an altitude sensor, and other sensors can be used, and a plurality of sensors can be used in combination.

The GPS 115 is a system measuring geographical information by using an artificial satellite. The GPS 115 transmits a signal to the artificial satellite, and specifies a geographical position from a time difference until a response of the signal is returned. Hereinafter, the position is referred to as image-capturing position information. The image-capturing position information includes longitude information, latitude information, and time information.

The in-camera 116 is a camera disposed on the same surface as the display 104 in a housing of the smartphone 100.

The out-camera 117 is a camera disposed on a side opposite to the display 104 in the housing of the smartphone 100. In FIGS. 1A and 1B, one in-camera 116 and one out-camera 117 are illustrated; however, the number of in-cameras 116 and the number of out-cameras 117 are not limited thereto. A plurality of cameras different in focal length may be mounted.

The live-view image captured by the in-camera 116 or the out-cameral 17 or both can be displayed on the display 104. It is possible to select whether to capture an image of a scene the user sees or to capture an image of the user himself/herself, based on whether to use the in-camera 116 or the out-camera 117. In a case where both of the in-camera 116 and the out-camera 117 are selected, the LV images captured by the respective cameras are displayed on the display 104.

The infrared camera 118 is a camera disposed on the same surface as the display 104 in the housing of the smartphone 100, and is disposed on a side of the sub-speaker 112b opposite to the in-camera 116. Data on a face of the user is analyzed by the infrared camera 118 to create a depth map of the face and an infrared image. This is also usable to unlock a lock state of the smartphone 100.

The camera image processing unit 119 performs various kinds of image processing and recognition of display items on a screen displayed on the display 104 under the control of the CPU 101. The camera image processing unit 119 can perform various kinds of image processing on an image stored in the nonvolatile memory 103 or the recording medium 108, a video signal acquired through the external I/F 109, an image acquired through the communication I/F 110, and the like.

An operation of a finger or a stylus that has not been in touch with the touch panel 106a newly touching the touch panel 106a, namely, start of touch (hereinafter, referred to as Touch-Down).

A state where a finger or a stylus is in touch with the touch panel 106a (hereinafter, referred to as Touch-On).

An operation of a finger or a stylus moving over the touch panel 106a while being in touch with the touch panel 106a (hereinafter, referred to as Touch-Move).

An operation of a finger or a stylus that has been in touch with the touch panel 106a detaching from the touch panel 106a, namely, end of touch (hereinafter, referred to as Touch-Up).

A state where nothing is in touch with the touch panel 106a (hereinafter, referred to as Touch-Off).

When Touch-Down is detected, Touch-On is also detected at the same time. Unless Touch-Up is detected after Touch-Down, Touch-On is normally continuously detected. When Touch-Move is detected, Touch-On is also detected at the same time. When a touch position is not moved even though Touch-On is detected, Touch-Move is not detected. When Touch-Up of all of fingers and styluses that have been in touch is detected, Touch-Off is detected.

These operations and states and positional coordinates of the touch panel 106a where a finger or a stylus is in touch are notified to the CPU 101 through the internal bus 120. The CPU 101 determines which operation (touch operation) has been performed on the touch panel 106a, based on the notified information.

As for Touch-Move, a moving direction of the finger or the stylus moving on the touch panel 106a can be also determined for each of a vertical component and a horizontal component on the touch panel 106a based on change in positional coordinates. In a case where Touch-Move of a predetermined distance or more is detected, it is determined that slide operation has been performed. An operation of rapidly moving a finger by a certain distance while the finger is in touch with the touch panel 106a, and then detaching the finger is referred to as flick.

In other words, the flick is a moving operation of rapidly moving the finger on the touch panel 106a like a flip. When Touch-Move of a predetermined distance or more at a predetermined speed or more is detected and Touch-Up is then detected, it can be determined that the flick has been performed (it can be determined that flick has been performed following slide operation).

Further, a touch operation of touching a plurality of positions (e.g., two positions) at the same time and bringing the touch positions close to each other is referred to as pinch-in, and a touch operation of bringing the touch positions away from each other is referred to as pinch-out.

Pinch-out and pinch-in are collectively referred to as pinch operation (or simply referred to as pinch). As the touch panel 106a, a touch panel of any of various types such as a resistance film type, an electrostatic capacitance type, a surface acoustic wave type, an infrared type, an electromagnetic induction type, an image recognition type, and an optical sensor type may be used.

There is a method in which touch is detected when the touch panel is actually touched, and a method in which touch is detected when a finger or a stylus approaches the touch panel. The touch panel may adopt any of the methods.

The sound collection device 150 is a device that is connected to the Internet, can exchange data with the smartphone 100 through the communication I/F 110, and includes a sound collection unit 151, a GPS 152, and a sound processing unit 153. In a case where sound data collected by the sound collection unit 151 is selected by user operation, the sound collection device 150 can acquire the sound data, positional information acquired by the GPS 152, and the like through the communication I/F 110, and can store the sound data, the positional information, and the like, in association with a moving image captured by the out-camera 117 or other cameras.

The cloud storage 250 can exchange information such as image data with the smartphone 100 through the communication I/F 110. For example, in a case where the user captures a moving image by using the out-camera 117, the moving image can be stored not in the recording medium 108 incorporated in the smartphone 100, but in the cloud storage 250 in real time. At this time, as described above, the moving image is stored in the cloud storage 250 in association with the sound information acquired by the sound collection unit 113 or the sound collection device 150 and the positional information.

A display example of sound collection devices (microphones) when a moving image is captured by using the smartphone 100 according to the present example embodiment, and a method of selecting a sound collection device, are described with reference to FIG. 3 to FIG. 7.

Figure 3:
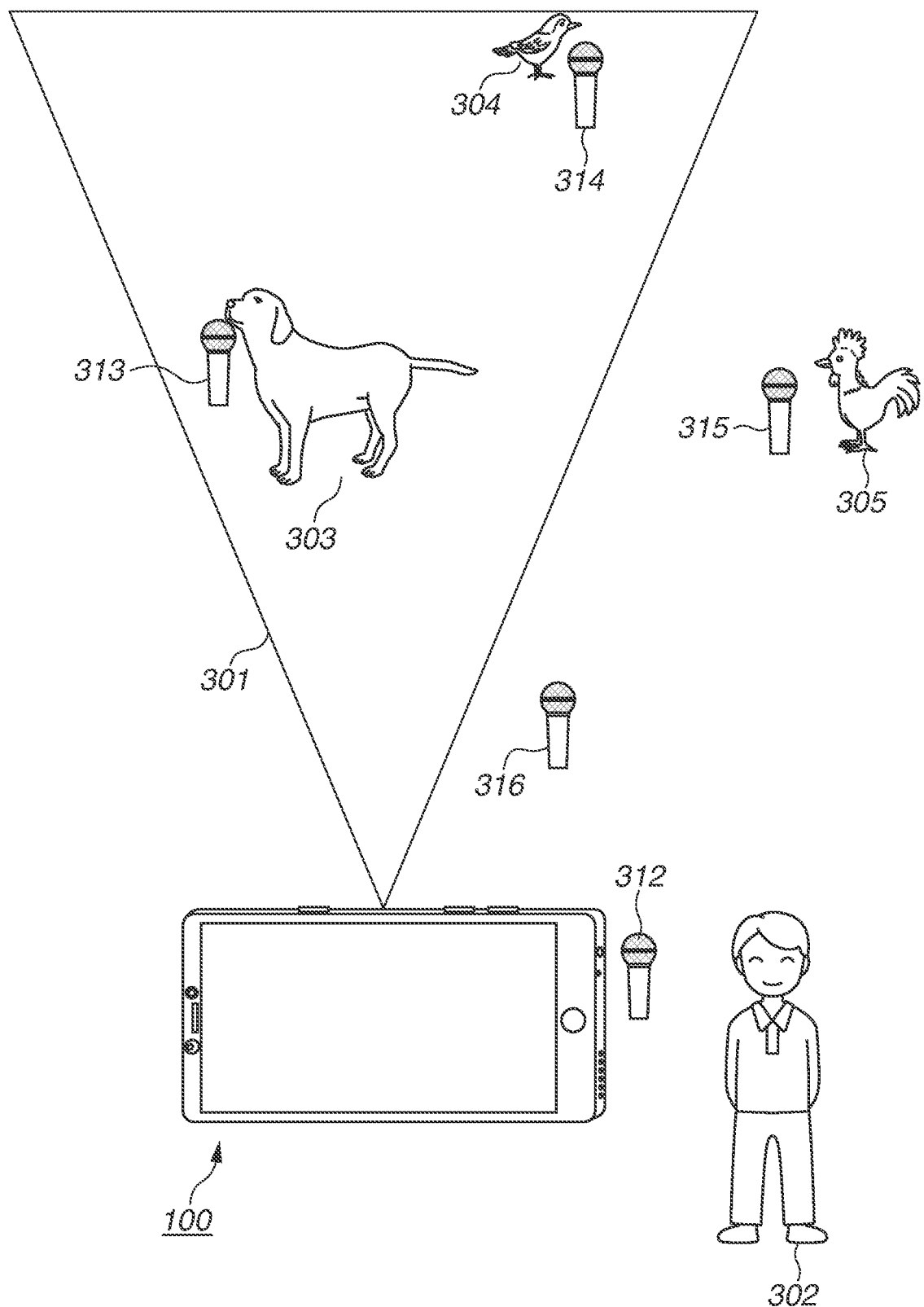
FIG. 3 is a diagram illustrating a positional relationship between the smartphone and sound collection devices (microphones) according to one embodiment of the present disclosure.

FIG. 3 is a diagram illustrating an example of a positional relationship between objects in the LV image and a plurality of selectable sound collection devices (microphones) according to the present example embodiment. FIG. 3 illustrates a scene where a user 302 holds the smartphone 100 to capture a moving image by using the out-camera 117. A range 301 indicates a range of an image capturing viewing angle captured by the out-camera 117 of the smartphone 100. Objects 303 to 305 are present on a side of the smartphone 100 opposite to the user 302 and on a side where the out-camera 117 is disposed. The object 303 is an object (dog) to be imaged as a main object by the user 302. The object 304 is an object (little bird) present behind the object 303 as the main object. The object 305 is an object (chicken) present on a right side in an image capturing direction, out of the image capturing viewing angle (range 301) of the out-camera 117.

A microphone 312 is a microphone that can collect sound through the sound collection unit 113 incorporated in the smartphone 100, and can collect sound around the smartphone 100, namely, around the user 302. Devices that can collect sound, illustrated as microphones 313 to 316 are devices such as wireless microphones. The microphones 313 to 316 are connected to the Internet, and the user can freely acquire sound by connecting a device such as the smartphone 100 connectable to the Internet, to the microphones 313 to 316.

The microphone 313 is a wireless microphone near the object 303, and can collect sound around the object 303. The microphone 314 is a wireless microphone near the object 304, and can collect sound around the object 304. The microphone 315 is a sound collection device that can collect sound around the object 305. The microphone 316 is a wireless microphone out of the range 301. No object is present near the microphone 316, but the microphone 316 is optionally selectable. The microphones 313 to 316 are microphones selectable by the user. Sound information collected by each of the microphones 313 to 316 can be acquired and stored in the recording medium 108 or the cloud storage 250 by performing communication through the communication I/F 110 of the smartphone 100. The smartphone 100 can perform bidirectional communication with each of the microphones 313 to 316 through the communication I/F 110.

Among the microphones 313 to 316, not only one microphone but also a plurality of microphones is selectable. In a case where a plurality of microphones is selected, the CPU 101 can automatically determine a ratio of sound to be used by analyzing acquired sound, or the user can optionally determine the ratio of sound. As the microphones 313 to 316, wireless microphones detected by the smartphone 100 through the Internet are illustrated, and the display method is not limited thereto. Instead of the microphone icons, speaker icons may be displayed. The microphones 312 to 316 are displayed in the same manner irrespective of a connection method with the smartphone 100, but may be displayed in different manners.

Figure 4:
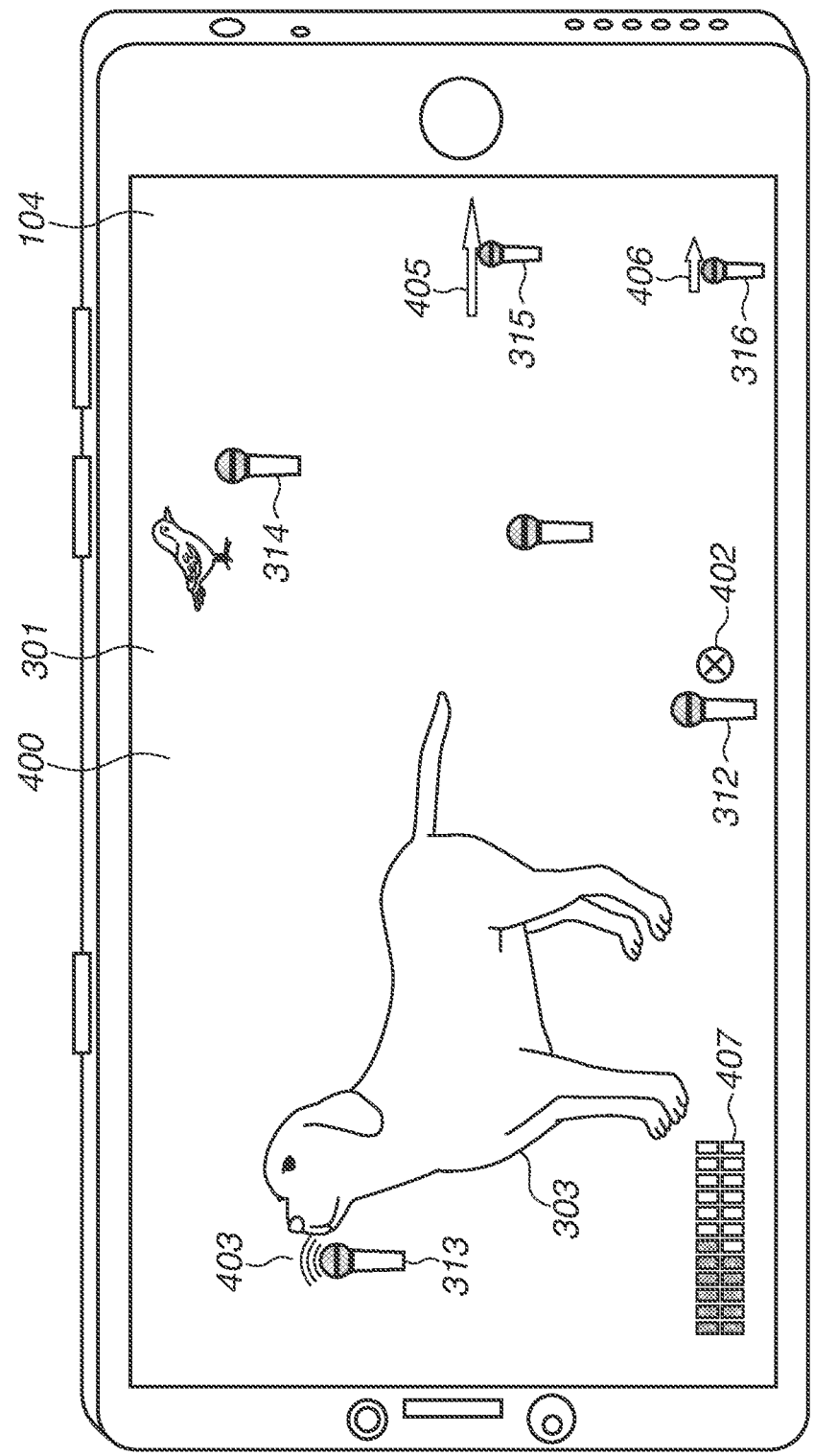
FIG. 4 is a diagram illustrating an example of a screen to select a sound collection device (microphone), displayed on a display according to one embodiment of the present disclosure.

FIG. 4 illustrates an example in which the sound collection devices (hereinafter, wireless microphones) that can collect sound through the Internet are displayed on the display 104 by being superimposed on the LV image captured by the out-camera 117, in a state as illustrated in FIG. 3. An LV image 400 of the range 301 is displayed on the display 104. A display item 402 indicates the microphone incorporated in the smartphone 100 (built-in sound collection item). A display item 403 indicates that the microphone 313 is currently selected by the user and sound information collected by the microphone 313 is currently used. Display items 405 and 406 indicate that the microphones 315 and 316 are out of the range 301 as the image capturing viewing angle. The display items 405 and 406 both notify the user that the microphones 315 and 316 are present on a right side out of the range 301, and a size of an arrow indicates a distance from the range 301. In FIG. 4, an arrow of the display item 406 is smaller (shorter) than an arrow of the display item 405. This indicates that the microphone 316 is positioned close to the range 301 more than the microphone 315. The display items 405 and 406 enable the user to visually recognize the sound collection devices present out of the image capturing viewing angle. Therefore, the user can select desired sound from a larger number of sound collection devices. When the user selects any of the microphones 312 to 316 by touch operation in the state illustrated in FIG. 4, the microphone from which the sound information to be stored in association with the moving image is acquired can be selected or changed. A display item 407 is a level meter indicating the sound collection information on the currently-selected microphone. In a case where the sound collection information from one microphone is used, an upper part indicates a left (L) side, and a lower part indicates a right (R) side. In a case where the sound collection information from a plurality of microphones is used, the upper part and the lower part of the display item 407 indicate level meters of the sound collection information from different microphones.

FIG. 5 illustrates examples of a display mode depending on a state of the microphone. In a case of the currently-selected microphone (in a selected state), display indicating sound waves output from a microphone icon is imparted to the corresponding microphone icon. This indicates that the sound is collected from the corresponding microphone. In a case of an unselected microphone (in a non-selected state), display of waves is not imparted. Before capturing of a moving image is instructed in step S620 in FIG. 6B described below (i.e., when moving image is not captured), the sound collected by the microphone selected by the user is output from the sound output unit 112. After capturing of a moving image is instructed (i.e., when moving image is captured), the sound collected by the microphone selected by the user is stored in association with the moving image being captured. At this time, the sound of the selected microphone is not output. Note that the display depending on the state of the microphone is not limited to the display mode as illustrated in FIG. 5. A color of the microphone may be changed or an animation such as vibration of the microphone icon may be displayed as long as the user can visually recognize the different state of the microphone.

A selectable microphone is displayed as a microphone icon. Displaying the microphone icon enables the user to visually recognize that the microphone (sound collection device) is present at a position where the icon is displayed. In a case where a selectable microphone is out of the image capturing viewing angle (range) being currently captured, a display item of a selectable microphone out of screen area is displayed. A direction (position) of the microphone out of the image capturing viewing angle is illustrated by a direction item such as an arrow. A display item of an error microphone is displayed, for example, in a case where the microphone is temporarily unconnectable due to communication error or in a case where the wireless microphone is not turned on (is turned off) due to battery run-out, etc. and the wireless microphone cannot collect sound, even though the microphone is selectable if an error has not occurred. In other words, the display item of the error microphone indicates a sound collection state or a communication connection state of the wireless microphone. Further, for example, in a case where the microphone is not usable because the microphone is already used (selected) by the other user, the display item of the error microphone is displayed.

The method of representing the microphone is not limited thereto. A sound level may be represented by a size of the microphone icon, or auxiliary information for selection by the user, such as a level meter may be displayed near the microphone. Although the arrow is used to indicate the microphone position out of the viewing angle, the direction item indicating the direction is not limited to the arrow. Further, a distance may be represented by a length or a thickness of the arrow, or a recommendation degree may be represented by changing a color of the arrow based on a sound collection situation. Further, a plurality of wireless microphones is selectable. For example, when an unselected microphone is touched, the microphone is set to a sound collection information acquisition target. In addition, even when another microphone is touched, the microphone is not switched, and is added to the sound collection information acquisition target. This makes it possible to associate the plurality of pieces of sound collection information with the moving image. When the microphone already selected is touched again, the selection is canceled, which enables sound collection from the optional microphone. To switch the microphone more smoothly, the sound collection information may be switched in a crossfading manner in response to operation like drag and drop from one microphone to another microphone.

Figure 6A:
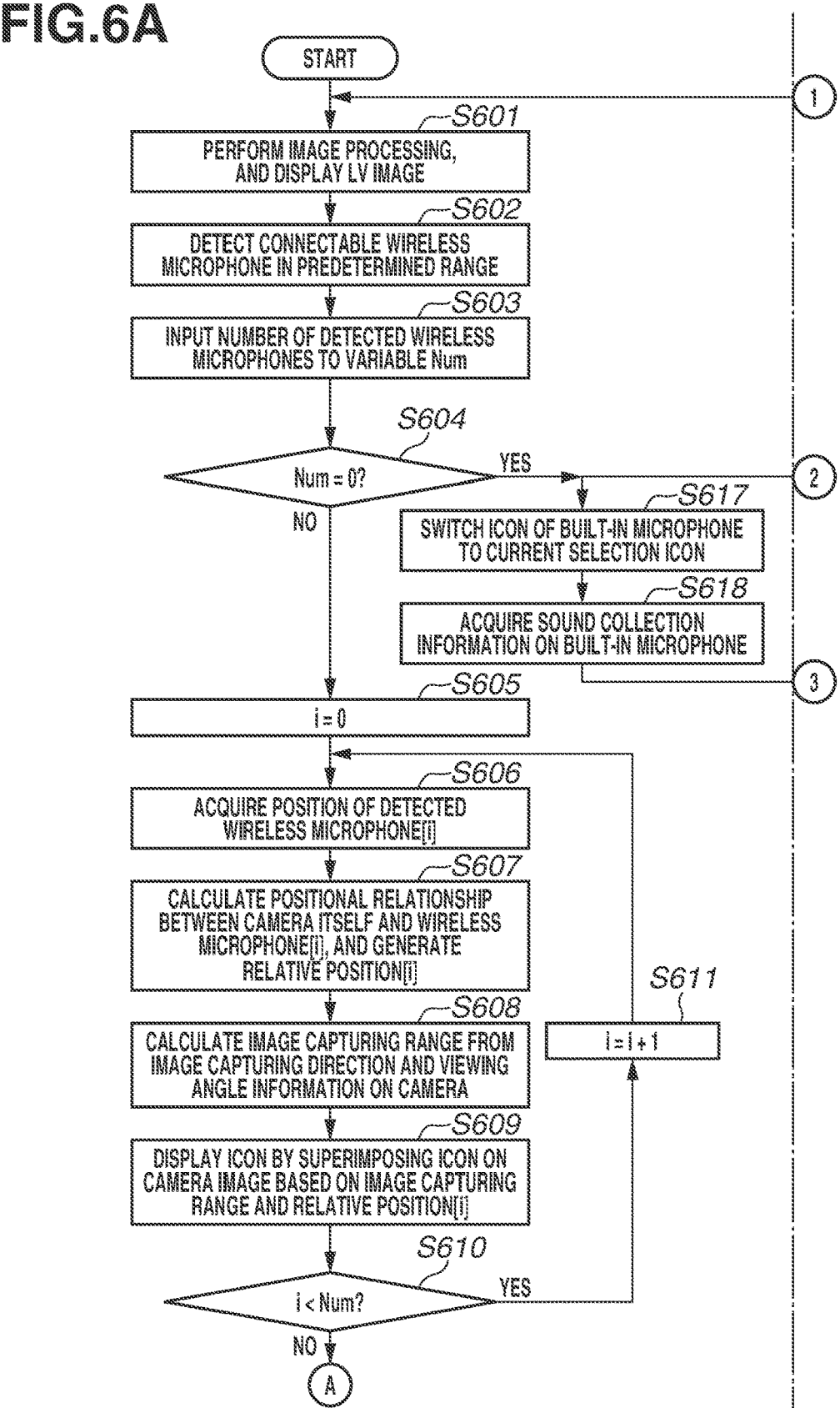
FIGS. 6A and 6B are a flowchart illustrating control to select a sound collection device (microphone) according to one embodiment of the present disclosure.
Figure 6B:
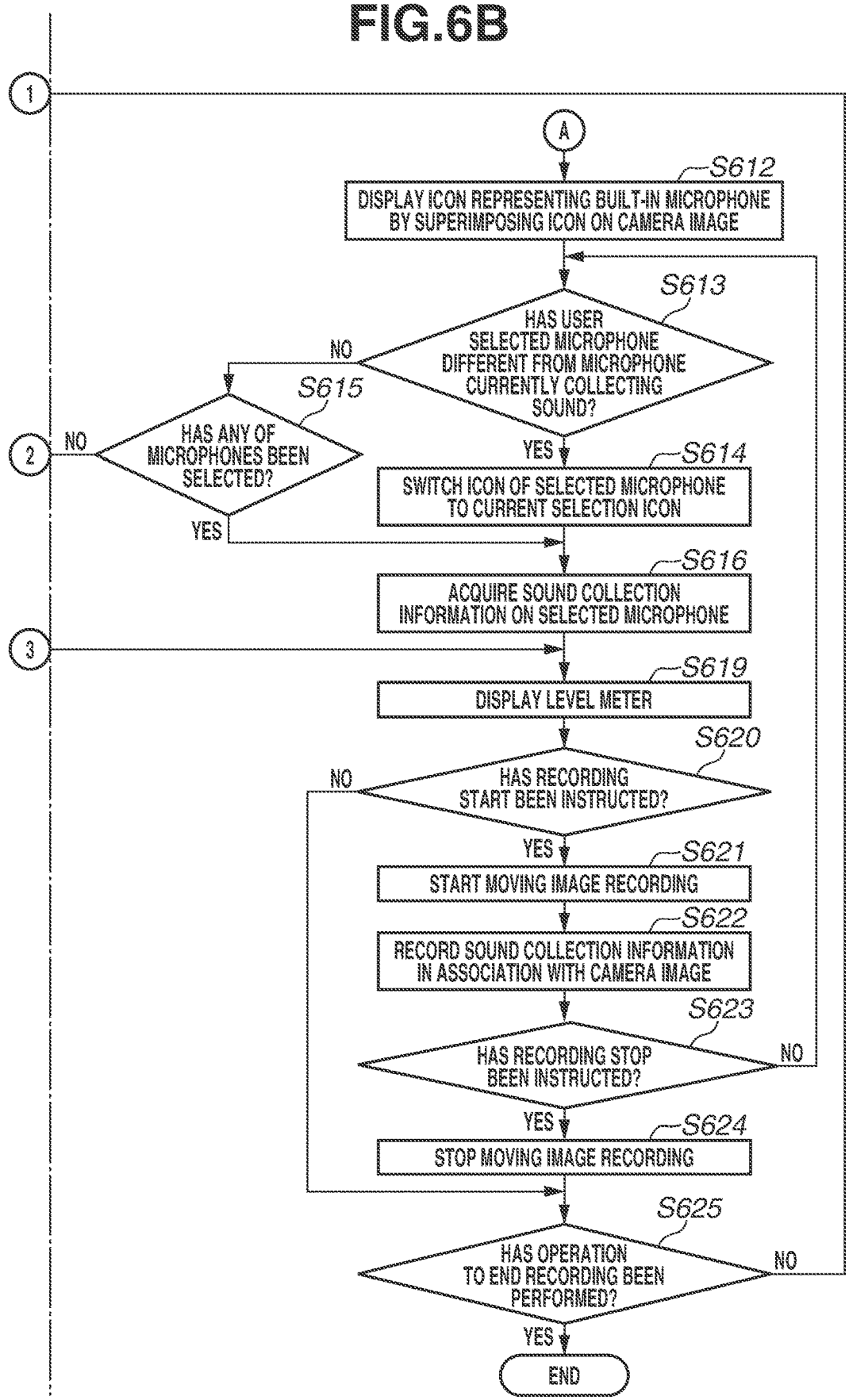

FIGS. 6A and 6B are a flowchart illustrating control of the smartphone 100 according to the present example embodiment.

FIGS. 6A and 6B are a control flowchart of moving image capturing mode processing started in a moving image capturing standby state after the smartphone 100 is started up (turned on). The control processing is realized when the CPU 101 loads the programs stored in the nonvolatile memory 103 to the memory 102 and executes the programs.

In step S601, the CPU 101 causes the camera image processing unit 119 to perform image processing on an image captured by the in-camera 116 or the out-camera 117, and displays the resultant image as a live-view image on the display 104.

In step S602, the CPU 101 detects connectable wireless microphones present in a predetermined range through the communication I/F 110. At this time, the CPU 101 also acquires GPS information on each of the wireless microphones.

In step S603, the CPU 101 inputs the number of wireless microphones detected in step S602, to a variable Num, and stores the variable Num in the memory 102.

In step S604, the CPU 101 determines whether the variable Num is zero. In a case where the variable Num is zero (YES in step S604), the processing proceeds to step S617. In a case where the variable Num is not zero (NO in step S604), the processing proceeds to step S605.

In step S605, the CPU 101 initializes a variable i with zero, and stores the variable i in the memory 102. The variable i is described below in step S606.

In step S606, the CPU 101 acquires positional information on the i-th detected wireless microphone among the wireless microphones detected in step S602. The positional information acquired in this step is absolute positional information.

In step S607, the CPU 101 acquires positional information on the smartphone 100 by using the GPS 115. The CPU 101 calculates a relative position of the i-th wireless microphone to the smartphone 100 from the positional information on the smartphone 100, the positional information on the wireless microphone acquired in step S606, and a direction of the camera currently capturing an image. The position of the detected microphone can be displayed on the LV image in step S609 described below, from the relative positional relationship between the smartphone 100 and the microphone calculated in this step. In other words, the relative position calculated in this step is information corresponding to the positional information on the wireless microphone.

In step S608, the CPU 101 acquires image capturing viewing angle information from the image capturing direction and specification information on the camera currently capturing an image, thereby calculating an image capturing range. FIG. 3 illustrates an example of the positional relationship at this time. It is assumed that the image capturing range acquired in step S608 is the range 301, objects detected in the live-view image are the objects 303 to 305, and the wireless microphones detected in step S602 are the microphones 313 to 315. The range 301 is a range capturable by the out-camera 117, and is a range displayed on the display 104. More specifically, the objects 303 and 304 are imaged, and the microphones 313 and 314 are wireless microphones included in the image capturing viewing angle. The object 305 is not included in the image capturing viewing angle. The microphones 315 and 316 are also not included in the image capturing viewing angle (are out of range 301); however, the microphones 315 and 316 are optionally selectable by the user, and the sound information is acquirable from the microphones 315 and 316 in a manner similar to the microphones 313 and 314.

The microphone 312 indicates a microphone (sound collection unit 113) incorporated in the smartphone 100, and the sound information collected by the microphone 312 is similarly acquirable and selectable. The sound information to be used is not limited to the sound information collected by only one of the microphones 312 to 316, and the sound information collected by the plurality of microphones are usable. In a case where the sound information collected by the plurality of microphones is used, the user may optionally select the ratio of sound of each of the microphones to be used, or the CPU 101 may automatically determine the ratio from the acquired sound information collected by the plurality of microphones and synthesize the sound.

In step S609, the CPU 101 displays the display items illustrated in FIG. 5 by superimposing the display items on the LV image, based on the relative positions of the wireless microphones calculated in step S607 and the image capturing range calculated in step S608. FIG. 4 illustrates an example displayed on the display 104 of the smartphone 100 at this time. As illustrated in FIG. 4, the live-view image (LV image 400) of the range 301 is displayed on the display 104.

In FIG. 4, it is found from the display item 403 that the sound information collected by the microphone 313 is used and selected.

In step S610, the CPU 101 refers to the memory 102, and determines whether the variable i is less than the variable Num. In a case where the variable i is less than the variable Num (YES in step S610), the processing proceeds to step S611. Otherwise (NO in step S610), the processing proceeds to step S612.

In step S611, the CPU 101 increments the variable i by one, and stores the variable i in the memory 102. The processing then returns to step S606.

In step S612, the CPU 101 displays the display item indicating the built-in microphone (sound collection unit 113) of the smartphone 100, on the LV image of the display 104. In other words, the CPU 101 superimposes and displays the display item 402 in FIG. 4 on the LV image 400.

In step S613, the CPU 101 determines whether the user has selected, through the operation unit 106, a microphone different from the microphone currently collecting sound. In a case where the user has selected a microphone different from the microphone currently collecting sound (YES in step S613), the processing proceeds to step S614. Otherwise (NO in step S613), the processing proceeds to step S615.

In step S614, the CPU 101 changes the icon indicating the wireless microphone selected by the user in step S613, to a display item indicating the selected microphone, and displays the display item on the display 104. In a case where the microphone 314 has been selected by the user operation in the state illustrated in FIG. 4, the display item 403 is imparted to the microphone 314.

In step S615, the CPU 101 determines whether any of the wireless microphones has been selected. In a case where any of the wireless microphones has been selected (YES in step S615), the processing proceeds to step S616. In a case where no wireless microphone has been selected (NO in step S615), the processing proceeds to step S617.

In step S616, the CPU 101 acquires the sound collection information on the selected microphone. As described above in the description for the display item 407 in FIG. 4, when a moving image is not captured, the sound collected by the selected microphone is output from the sound output unit 112. When a moving image is captured, the sound is stored in association with the moving image without being output.

In step S617, the CPU 101 displays an icon indicating the built-in microphone as the selected microphone on the display 104 because the determination result in step S615 is NO. In other words, the display item 403 is imparted to the microphone 312 in FIG. 4.

In step S618, the CPU 101 acquires the sound collection information on the built-in microphone by using the sound collection unit 113.

In step S619, the CPU 101 draws a sound level meter based on the sound collection information acquired in step S616 or S618, and displays the sound level meter on the display 104. For example, as with the display item 407 in FIG. 4, a level meter about the sound information acquired by the microphone selected by the user is displayed.

In step S620, the CPU 101 determines whether start of moving image capturing has been instructed.

In a case where start of moving image capturing has been instructed (YES in step S620), the processing proceeds to step S621. In a case where start of moving image capturing has not been instructed (NO in step S620), the processing proceeds to step S625. In the present example embodiment, when Touch-On of an icon to start moving image capturing displayed on the display 104 is performed or the volume button 106c or 106d is depressed while the LV image is displayed on the display 104 in the image capturing standby state, it is determined that start of moving image capturing has been instructed.

In step S621, the CPU 101 starts moving image capturing. More specifically, the CPU 101 creates a moving image file in the recording medium 108 or the cloud storage 250, and stores the moving image captured by the in-camera 116 or the out-camera 117 with the current set contents.

In step S622, the CPU 101 stores the moving image, capturing of which has been started in step S621, in association with the sound information. At this time, the CPU 101 stores the moving image and the sound information in the recording medium 108, or in the cloud storage 250 through the communication I/F 110, based on the user setting. Using the cloud storage 250 on the Internet 111 makes it possible to record a moving image long in recording time and a moving image having a large capacity including a lot of sound information, as compared with a case of using the recording medium 108. In this example, the moving image and the associated sound information are stored in the recording medium 108 or the cloud storage 250; however, for example, the moving image and the associated sound information may be output through the external I/F 109, and an external signal receiving device may receive the moving image and the associated sound information. In other words, the moving image and the associated sound information may be output to an external recording device (e.g., High-Definition Multimedia Interface® (HDMI) recording device) connected by a cable or radio.

In step S623, the CPU 101 determines whether stop of moving image capturing has been instructed. In a case where stop of moving image capturing has been instructed (YES in step S623), the processing proceeds to step S624. In a case where stop of moving image capturing has not been instructed (NO in step S623), the processing returns to step S613. More specifically, the instruction to stop moving image capturing indicates touch operation of an icon to stop moving image capturing displayed on the display 104, or depression of any of the volume buttons 106c and 106d and the home button 106e.

When the home button 106e is depressed while a moving image is captured, the screen returns to the home screen, and the moving image capturing is stopped at the same time.

In step S624, the CPU 101 stops the moving image capturing. When the moving image capturing is stopped, the CPU 101 performs processing to close the moving image file created in the recording medium 108 or the cloud storage 250 (addition of attribute information, etc.).

In step S625, the CPU 101 determines whether the user has performed operation to end the moving image capturing. In a case where the user has performed the operation to end the moving image capturing (YES in step S625), the processing end. In a case where the user has not performed the operation to end the moving image capturing (NO in step S625), the processing returns to step S601.

In the present example embodiment, the wireless microphones around the smartphone 100 are detected, and display items of detected wireless microphones are superimposed and displayed on the LV image. In the above description, the user selects the displayed display item (microphone icon) by touch operation to acquire sound data from the microphone associated with the selected microphone icon, and the sound data is stored in association with the moving image. However, the method is not limited thereto.

Figure 7:
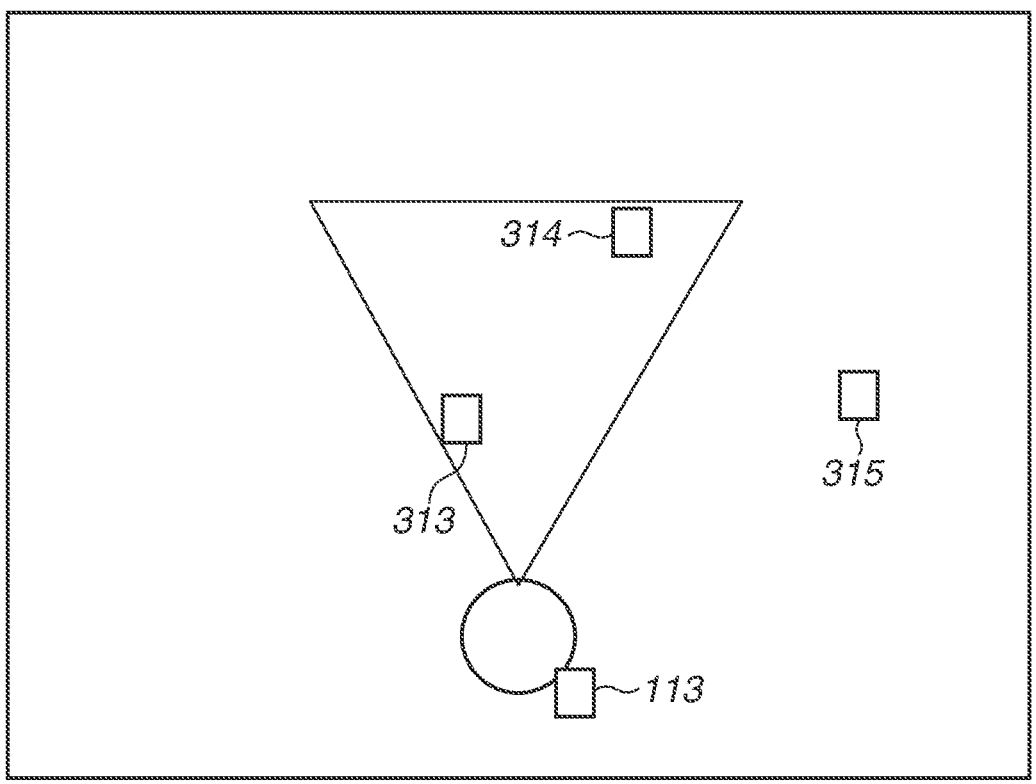
FIG. 7 is a diagram illustrating another display example of the screen to select a sound collection device (microphone) according to one embodiment of the present disclosure.

The microphone can be selected not only by touch operation but also by other operation such as operation by a physical button such as a cross key. Further, the example in which the microphone superimposed and displayed on the LV image is selected has been described; however, for example, a radar as illustrated in FIG. 7 may be displayed separately from the LV image to cause the user to select the microphone. When the microphone near the main object is selected in image capturing, sound collection sensitivity of the microphone near the main object may be changed based on a ratio of the main object occupying the image capturing viewing angle, thereby creating presence, etc. In a case of stereo sound, LR balance may be corrected based on relationship between the camera and the direction of the selected microphone in sound collection, to collect the sound more faithfully.

When the plurality of wireless microphones is selected, the microphones can be selected by the following method in addition to the above-described method. For example, the user can change the volume of the sound to be collected, by sliding a finger in a vertical direction or a right-left direction or performing gesture operation such as pinch-in and pinch-out, near the wireless microphone to be changed in volume of collected sound, among the plurality of selected microphones. The operation is not limited to the operation near the wireless microphone. The user can change the volume by performing the above-described gesture operation after selecting the wireless microphone to be changed in volume by tap operation, long depression, or double-tap. For example, in a case where double-tap is performed on the display item 407 in FIG. 4 while the two wireless microphones are selected, the sound collection levels (volumes) of the two wireless microphones may be switched. In other words, when double-tap is performed while the volume of the microphone 313 in FIG. 4 is set to 70 and the volume of the microphone 312 is set to 15, the volume of the microphone 313 can be changed to 15 and the volume of the microphone 312 can be changed to 70 (volumes are selectable up to 100). The operation is not limited to switching. When double-tap is performed, the volumes of the sound acquired from the wireless microphones selected by the user may be changed to the same volume (same sound collection level). The volumes of the wireless microphones may be changed to the same volume in response to double-click (quick depression twice) of any of the volume buttons 106c and 106d or depression of both of the volume buttons 106c and 106d at a time, without being limited to double-tap.

Further, the adjusted volume of sound acquired from each of the microphones is displayed by increasing/decreasing the number of wave lines of the display item 403, or changing the display mode of the display item 407. In a case where the volume of the microphone is large, the microphone icon may be displayed with low transmittance (to reduce transparency), whereas in a case where the volume of the microphone is small, the microphone icon may be displayed with high transmittance (to increase transparency). Further, a size of the microphone icon may be changed with the volume.

The display mode corresponding to the state of the microphone described above with reference to FIG. 5 may be changed irrespective of presence/absence of microphone selection and presence/absence of connection. For example, the display mode of the display item (microphone icon) may be changed based on volume of the sound collected by the microphone irrespective of volume adjustment of the wireless microphone by the user. More specifically, a color of the microphone icon collecting loud sound is changed. For example, in a case where the microphone collects loud sound, the color of the microphone icon is changed to blue. In a case where the microphone collects relatively loud sound even though the sound is smaller than the sound collected by the microphone displayed in blue, the color of the microphone icon is changed to light blue. In a case where the microphone is connected but does not collect sound, the color of the microphone icon is changed to grey like the error microphone in FIG. 5. Change of the display mode is not limited to change in color. The microphone icon of the microphone collecting sound may be blinked, and the blinking speed may be increased as the collected sound is louder. Alternatively, in the case where the collected sound is loud, the number of wave lines of the display item 403 may be increased to notify the user that the corresponding microphone collects loud sound.

To collect voice of a dog as a main object in moving image capturing, the microphone near the dog is selected by using the above-described method, and the voice of the dog is collected. To capture an image of the dog as an object together with voice of a photographer capturing the image of the dog, selecting the built-in microphone makes it possible to store and record the voice desired by the user in association with the captured image. Even in the image capturing standby not in the moving image capturing, the above-described method may be used to change sound output from a speaker incorporated in the smartphone 100.

As described above, in the present example embodiment, as the sound used for moving image capturing, the sound desired by the user can be selected among the sound collected by microphones at positions away from the smartphone without being limited to the sound around the user performing image capturing. This makes it possible to capture a moving image with the sound at the position far from the position where the user performs image capturing, and to capture a moving image with higher presence. In addition, the microphone at the position away from the smartphone is connected through the Internet, which enables the user to select a desired microphone from many options without requiring a labor and a cost for installation of microphones. This enables the user to perform a desired moving image capturing.

Note that the above-described various kinds of control performed by the CPU 101 may be performed by one hardware, or a plurality of pieces of hardware (e.g., plurality of processors and circuits) may share the processing to control the whole of the apparatus.

Various embodiments of the present disclosure have been described in detail based on the example embodiment. However, the present invention is not limited to the specific example embodiment, and can include various modes without deviating from the scope of the present invention.

Further, in the above-described example embodiment, the case where features of the present disclosure are applied to a smartphone has been described as an example; however, the present invention is not limited to applications to a smartphone, and may be applicable, for example, to other electronic apparatuses that include an image capturing unit and can perform bidirectional communication. For example, various embodiments of the present invention are applicable to a personal computer (PC), a personal digital assistant (PDA), a digital camera, a mobile image viewer, a music player, a game machine, an electronic book reader, etc.

Various embodiments of the present disclosure are also applicable to a control apparatus that communicates with an electronic apparatus (for example, a network camera) through wired communication or wireless communication and that remotely controls the electronic apparatus, without being limited to a main body of the electronic apparatus. Examples of such an apparatuses (to which various embodiments of the present disclosure may be applicable) that remotely control such an electronic apparatus, include a mobile phone terminal, a smartphone, a tablet PC, and a desktop PC. In various embodiments, such a control apparatus can remotely control such an electronic apparatus by transmitting a command to cause the electronic apparatus to perform various kinds of operations and settings based on an operation performed at the control apparatus and processing performed at the control apparatus. Further, in various embodiments, such a control apparatus may receive a live-view image captured by such an electronic apparatus through wired communication or wireless communication, and the control apparatus may display the live-view image.

Further, a control apparatus different from the electronic apparatus can acquire a live-view image and sound from a camera (image capturing unit) or a wireless microphone (sound collection unit) of the electronic apparatus through wired communication or wireless communication. In other words, the present example embodiment is also applicable to a system in which a control apparatus instructing control execution, an image capturing apparatus acquiring an image, and a sound collection device acquiring sound are individually provided and are connected through wired communication or wireless communication. In this case, the electronic apparatus serves as an image capturing apparatus. More specifically, the control apparatus performs the processing of the control flowchart in FIGS. 6A and 6B. In step S601, the control apparatus transmits a command to cause the electronic apparatus (image capturing apparatus) to transmit a LV image captured by a camera of the electronic apparatus to the control apparatus, acquires the LV image from the image capturing apparatus (receives image information), and displays the LV image. At this time, the control apparatus further acquires viewing angle information such as a position of the image capturing apparatus and an image capturing method. In control in steps S607 to S609, the control apparatus transmits a command to the image capturing apparatus or the wireless microphone, receives/acquires necessary information from each apparatus, and performs generation, calculation, and display of a relative position. In a case where the microphone is switched by the user, the control apparatus transmits a command to the selected wireless microphone, and receives information from the wireless microphone to acquire sound collection information. In a case where start of moving image recording has been instructed in step S620, the control apparatus transmits a command to start moving image recording to the image capturing apparatus, and moving image recording is started by using the camera provided in the image capturing apparatus. The control apparatus associates the received/acquired moving image with the sound information at the time when the control apparatus receives the moving image and the sound information, and records the moving image and the sound information in the recording medium or the cloud storage.

Other Example Embodiments

Various embodiments of the present disclosure are realized by supplying software (program) realizing the functions of the above-described example embodiment to a system or an apparatus through a network or a various kinds of storage media, and causing a computer (or CPU, microprocessor unit (MPU), etc.) of the system or the apparatus to read out and execute the program. In this case, the program and the storage medium storing the program configure the present disclosure.

According to the example embodiment of the present disclosure, the user can suitably select sound used for moving image capturing.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-058482, filed Mar. 30, 2021, which is hereby incorporated by reference herein in its entirety.

What is claimed is:

1. An electronic apparatus communicable with a plurality of sound collection devices, the electronic apparatus comprising:
   a display unit;
   at least one processor; and
   at least one memory storing instructions that, when executed by the at least one processor, cause the electronic apparatus to function as:
   an image acquisition unit configured to acquire an image captured by an image capturing apparatus, from the image capturing apparatus;
   a position acquisition unit configured to acquire, for each of the plurality of sound collection devices, positional information relative to the image captured by the image capturing apparatus;
   a display control unit configured to control the display unit to display, for each of the plurality of sound collection devices, a display item corresponding to the each sound collection device, based on the positional information for the respective each sound collection device, acquired by the position acquisition unit, and to display, with the plurality of displayed display items, the image acquired by the image acquisition unit,
wherein the display control unit is configured to perform control to display, for the each sound collection device, the corresponding display item, even if the display item corresponds to a sound collection device not located within a range of image capturing of the acquired image; and
a control unit configured to perform control to acquire sound information from a sound collection device, selected by a user, from the plurality of sound collection devices, and to associate and record the acquired image and the acquired sound information in a recording device.

2. The electronic apparatus according to claim 1, wherein the display items corresponding to the sound collection devices are each at least one of an icon of the respective sound collection device, a display item about the respective sound information, or a display item indicating a direction of a position of the respective sound collection device if the respective sound collection is not located within the range of image capturing of the acquired image.

3. The electronic apparatus according to claim 1, wherein the control unit controls the display unit to display a display item corresponding to a sound collection device of the plurality of sound collection devices, that is located within the range of image capturing of the acquired image, and a display item corresponding to a sound collection device not located within the range of image capturing of the acquired image, in different display modes.

4. The electronic apparatus according to claim 1, wherein a display item corresponding to a sound collection device located within the range of image capturing of the acquired image and a display item corresponding to a sound collection device not located within the range of image capturing of the acquired image, are different in color, size, or transmittance in display modes.

5. The electronic apparatus according to claim 1, wherein the control unit controls the display unit to display, as a display item corresponding to a sound collection device not located within the range of image capturing of the acquired image, a direction item indicating a direction of a position of the sound correction device not located within the range of image capturing of the acquired image, relative to an image capturing direction of the image capturing apparatus.

6. The electronic apparatus according to claim 1, wherein, in a case where the electronic apparatus includes a sound collection device, the control unit controls the display unit to display a built-in sound collection item indicating the sound collection device provided in the electronic apparatus.

7. The electronic apparatus according to claim 1, wherein the control unit changes a display mode of each of the display items displayed for the plurality of sound collection devices based on a state of the respective sound collection device corresponding to the each display item.

8. The electronic apparatus according to claim 7, wherein the state of each of the sound collection devices is at least one of a communication connection state between each of the sound collection devices and the electronic apparatus, and a state of sound collected by each of the sound collection devices.

9. The electronic apparatus according to claim 1, wherein, in a case where at least one of the sound collection devices is selected by the user before the recording is started, the control unit outputs the sound information collected by the selected sound collection device from the electronic apparatus without recording the sound information in the recording device, and in a case where at least one of the sound collection devices is selected by the user after the recording is started, the control unit records the sound information collected by the selected sound collection device in the recording device without outputting the sound information from the electronic apparatus.

10. The electronic apparatus according to claim 1, wherein the control unit controls the display unit to display the display item corresponding to each of the plurality of sound collection devices with the image captured by the image capturing apparatus.

11. The electronic apparatus according to claim 1, further comprising an image capturing unit,
wherein the image acquisition unit acquires an image captured by the image capturing unit.

12. The electronic apparatus according to claim 1, wherein the image acquisition unit acquires the image captured by the image capturing apparatus, the image capturing apparatus being an apparatus different from the electronic apparatus, by communicating with the image capturing apparatus through wired communication or wireless communication.

13. A method of controlling an electronic apparatus communicable with a plurality of sound collection devices, the method comprising:
performing display;
acquiring an image captured by an image capturing apparatus, from the image capturing apparatus;
acquiring, for each of the plurality of sound collection devices, positional information relative to the image captured by the image capturing apparatus;
performing control to display, for each of the plurality of sound collection devices, a display item corresponding to the each sound collection device, based on the acquired positional information for the respective each sound collection device, and to display, with the plurality of displayed display items, the acquired image;
performing control to display, for the each sound collection device, the corresponding display item, even if the display item corresponds to a sound collection device not located within a range of image capturing of the acquired image; and
performing control to acquire sound information from a sound collection device, selected by a user, from the plurality of sound collection devices, and to associate and record the acquired image and the acquired sound information in a recording device.

14. A non-transitory computer-readable recording medium that stores a program for causing a computer to execute a method of controlling an electronic apparatus communicable with a plurality of sound collection devices, the method comprising:
performing display;
acquiring an image captured by an image capturing apparatus, from the image capturing apparatus;
acquiring, for each of the plurality of sound collection devices, positional information relative to the image captured by the image capturing apparatus;
performing control to display, for each of the plurality of sound collection devices, a display item corresponding to the each sound collection device, based on the acquired positional information for the respective each sound collection device, and to display, with the plurality of displayed display items, the acquired image;
performing control to display, for the each sound collection device, the corresponding display item, even if the display item corresponds to a sound collection device not located within a range of image capturing of the acquired image; and performing control to acquire sound information from a sound collection device, selected by a user, from the plurality of sound collection devices, and to associate and record the acquired image and the acquired sound information in a recording device.

* * * * *